United States Patent
Kim

(10) Patent No.: US 11,245,303 B2
(45) Date of Patent: Feb. 8, 2022

(54) MOTOR INCLUDING A BUSBAR AND A WIRE ASSEMBLY

(71) Applicant: LG INNOTEK CO., LTD., Seoul (KR)

(72) Inventor: Se Jong Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 155 days.

(21) Appl. No.: 16/608,988

(22) PCT Filed: Apr. 23, 2018

(86) PCT No.: PCT/KR2018/004675
§ 371 (c)(1),
(2) Date: Oct. 28, 2019

(87) PCT Pub. No.: WO2018/199573
PCT Pub. Date: Nov. 1, 2018

(65) Prior Publication Data
US 2020/0220414 A1     Jul. 9, 2020

(30) Foreign Application Priority Data

Apr. 26, 2017   (KR) .................. 10-2017-0053858

(51) Int. Cl.
*H02K 3/52*     (2006.01)
*H02K 11/215*   (2016.01)
(Continued)

(52) U.S. Cl.
CPC ............. *H02K 3/522* (2013.01); *H02K 5/225* (2013.01); *H02K 11/215* (2016.01); *H02K 21/16* (2013.01);
(Continued)

(58) Field of Classification Search
CPC ...... H02K 3/522; H02K 11/215; H02K 5/225; H02K 21/16; H02K 2203/09;
(Continued)

(56) References Cited

U.S. PATENT DOCUMENTS 10,850,886 B2 * 12/2020 Oh ......................... H02K 11/40
2007/0145838 A1 * 6/2007 Uchitani ................ H02K 29/08
310/68 B
(Continued)

FOREIGN PATENT DOCUMENTS

DE       202 12 273 U1    7/2003
EP       2 047 583 A1     4/2009
(Continued)

OTHER PUBLICATIONS

EBM WERKE (DE 20212273 U1, IDS, see English translation from EP office, printed on May 20, 2021.*
(Continued)

*Primary Examiner* — John K Kim
(74) *Attorney, Agent, or Firm* — Saliwanchik, Lloyd & Eisenschenk

(57) ABSTRACT

The present invention provides a motor including a stator, a rotor disposed inside the stator, a shaft coupled to the rotor, a busbar disposed above the stator, and a wire assembly connected to the busbar, wherein the wire assembly includes a grommet, a cable of which a part is disposed inside the grommet, and a first terminal connected to the cable. The first terminal includes a connecting end portion, the grommet includes a body having the cable therein, and an extension extending from the body and having the first terminal therein, the extension includes an insert hole formed to pass through from a lower surface of the extension to an upper surface of the extension, and the connecting end portion is disposed inside the insert hole.

17 Claims, 9 Drawing Sheets

(51) Int. Cl.
　　　*H02K 5/22*　　　(2006.01)
　　　*H02K 21/16*　　(2006.01)
　　　*B62D 5/04*　　　(2006.01)

(52) U.S. Cl.
　　　CPC ............ *B62D 5/04* (2013.01); *H02K 2203/09* (2013.01); *H02K 2203/15* (2013.01)

(58) Field of Classification Search
　　　CPC ...... H02K 2203/15; H02K 29/08; B62D 5/04; B62D 5/0406
　　　USPC .................................................. 310/68 B, 71
　　　See application file for complete search history.

(56) References Cited

U.S. PATENT DOCUMENTS

| | | | |
|---|---|---|---|
| 2011/0215658 A1* | 9/2011 | Tanabe | H01R 12/707 310/43 |
| 2012/0025746 A1* | 2/2012 | Kawakubo | H02K 11/33 318/400.25 |
| 2014/0354093 A1 | 12/2014 | Kashihara et al. | |
| 2015/0187462 A1* | 7/2015 | Kondo | H01R 43/16 310/71 |
| 2018/0123420 A1* | 5/2018 | Kombowski | H01R 4/30 |
| 2020/0212768 A1* | 7/2020 | Guardiola | H02K 11/40 |
| 2020/0220414 A1* | 7/2020 | Kim | H02K 21/16 |

FOREIGN PATENT DOCUMENTS

| | | |
|---|---|---|
| JP | 2011-131775 A | 7/2011 |
| JP | 2013-102633 A | 5/2013 |
| JP | 5992606 B2 | 9/2016 |
| KR | 10-2011-0048661 A | 5/2011 |
| KR | 10-2016-0085105 A | 7/2016 |
| WO | WO-2016/165705 A1 | 10/2016 |

OTHER PUBLICATIONS

Supplementary European Search Report dated Dec. 4, 2020 in European Application No. 18790386.9.

International Search Report in International Application No. PCT/KR2018/004675, filed Apr. 23, 2018.

* cited by examiner

MOTOR INCLUDING A BUSBAR AND A WIRE ASSEMBLY

CROSS-REFERENCE TO RELATED APPLICATIONS

This application is the U.S. national stage application of International Patent Application No. PCT/KR2018/004675, filed Apr. 23, 2018, which claims the benefit under 35 U.S.C. § 119 of Korean Application No. 10-2017-0053858, filed Apr. 26, 2017, the disclosures of each of which are incorporated herein by reference in their entirety.

TECHNICAL FIELD

The present invention relates to a motor.

BACKGROUND ART

An electric power steering system (EPS) is a system which secures turning stability of a vehicle and rapid restoring force so that a driver can stably drive. The EPS drives a motor to control operation of a steering shaft of the vehicle through an electronic control unit (ECU) according to travel conditions detected by a vehicle speed sensor, a torque angle sensor, and the like.

The motor includes a rotor and a stator. A coil is wound around the stator. A connecting end portion of the coil wound around the stator may be connected to a busbar. The busbar may include a terminal connected to the connecting end portion of the coil. The terminal of the busbar may be connected to the connecting end portion of the coil wound around the stator and connected to a wire assembly. The wire assembly is connected to an external power source.

Here, a terminal of the wire assembly is connected to the terminal of the busbar by fusing. However, a fusing process has problems of being a difficult operation, having a high failure rate, and increasing cost. Particularly, since the fusing process is needed for each terminal of three phases, there is a problem in that the number of manufacturing processes is increased.

DISCLOSURE

Technical Problem

The present invention is directed to providing a motor of which a terminal of a wire assembly is connectable to a terminal of a busbar without performing a fusing process.

Objectives that should be solved according to the embodiments are not limited to the above described objectives, and other objectives which are not described above will be clearly understood by those skilled in the art from the following specification.

Technical Solution

One aspect of the present invention provides a motor including a shaft, a rotor including a hole in which the shaft is disposed, a stator disposed outside the rotor, a busbar disposed above the stator, and a wire assembly connected to the busbar, wherein the wire assembly includes a grommet, a cable of which a part is disposed inside the grommet, and a first terminal connected to the cable. The first terminal includes a connecting end portion, the grommet includes a body having the cable therein and an extension extending from the body and having the first terminal therein, the extension includes an insert hole formed to pass through from a lower surface of the extension to an upper surface of the extension, and the connecting end portion is disposed inside the insert hole.

The busbar may include a second terminal, and the first terminal and the second terminal are insertion-coupled.

The second terminal may include a connector connected to a coil wound around the stator and a clip protruding upward from one side of the connector and coupled to the connecting end portion of the first terminal.

The clip may include a slot which is concavely formed from an upper end of the clip toward a lower side thereof and to which the connecting end portion of the first terminal is insertion-coupled.

The slot may include a hooking step protruding from a sidewall of the slot and configured to restrict movement of the connecting end portion of the first terminal.

The second terminal may include a base having a ring shape and a plurality of terminals connected to the base, and any one of the plurality of terminals may include the clip.

The clip may be disposed inside the insert hole.

The connecting end portion of the first terminal may have a shape bent such as a "⌐" shape.

The motor may further include a sensing magnet coupled to the shaft, wherein a front surface of the extension may be a curved surface, and a radius of a curvature of the front surface of the extension may be greater than an outer diameter of the sensing magnet.

An upper surface or a lower surface of the insert hole may include a sidewall having an inclined shape.

A width of an inlet of the slot may decrease toward a lower side thereof.

Advantageous Effects

According to an embodiment, since a terminal of a wire assembly is connected to a terminal of a busbar through an insertion coupling method without performing a fusing process, there are advantageous effects in that assembly or reassembly is facilitated and a manufacturing cost is reduced.

Particularly, since busbar terminals of three phases are connected to the wire assembly through one insertion coupling process, there is an advantageous effect in that a manufacturing process is significantly simplified.

MODES OF THE INVENTION

Hereinafter, exemplary embodiments of the present invention will be described with reference to the accompanying drawings in detail. Purposes, specific advantages, and novel features of the invention will be made clear from the exemplary embodiments and the following detailed description in connection with the accompanying drawings. Terms and words used in this specification and claims are not to be interpreted as limited to commonly used meanings or meanings in dictionaries and should be interpreted as having meanings and concepts which are consistent with the technological scope of the invention based on the principle that the inventors have appropriately defined concepts of terms in order to describe the invention in the best way. In the description of the invention, when it is determined that detailed descriptions of related well-known functions unnecessarily obscure the gist of the invention, the detailed descriptions thereof will be omitted.

It will be understood that, although the terms "first," "second," etc. may be used herein to describe various elements, these elements should not be limited by these terms. These terms are only used to distinguish one element from another. For example, a first element could be termed a second element, and a second element could similarly be termed a first element without departing from the scope of the present invention. As used herein, the term "and/or" includes combinations or any one of a plurality of associated listed items.

Figure 1:
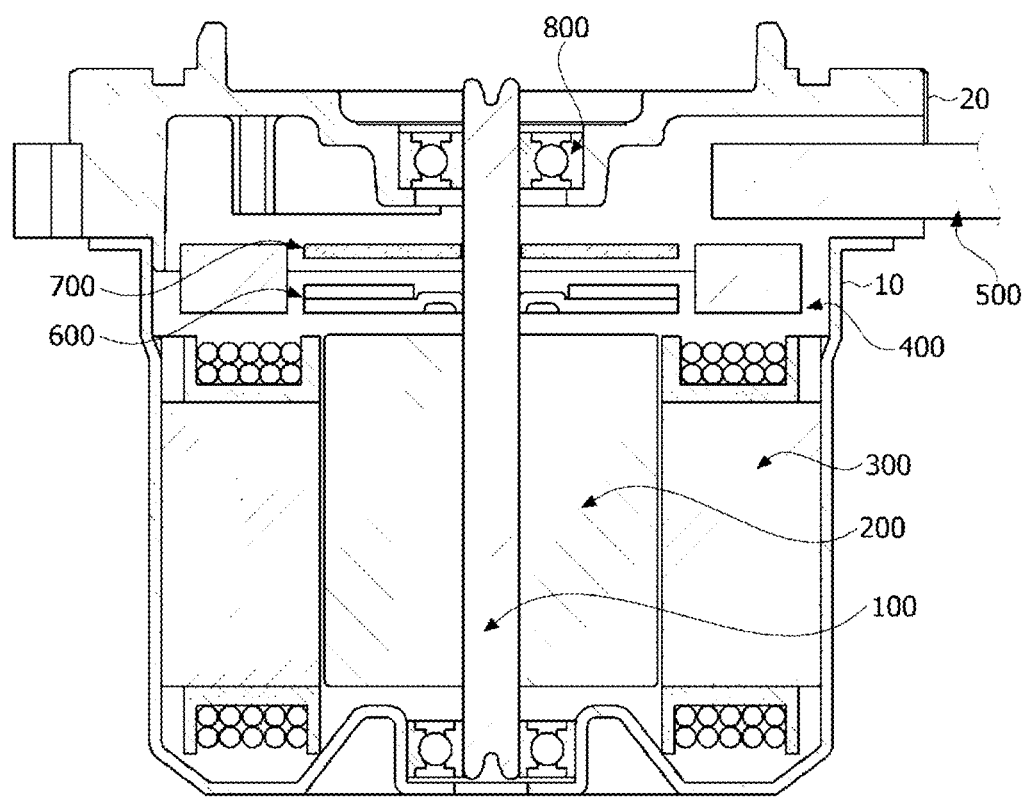
FIG. 1 is a view illustrating a motor according to an embodiment.

FIG. 1 is a view illustrating a motor according to an embodiment.

Referring to FIG. 1, the motor according to the embodiment may include a shaft 100, a rotor 200, a stator 300, a busbar 400, and a wire assembly 500.

A housing 10 may accommodate the rotor 200 and the stator 300 therein. The housing 10 has a cylindrical shape. In addition, the housing 10 includes an open upper portion. A bracket 20 covers the open upper portion of the housing 10. The stator 300 is positioned inside the housing 10. In addition, the rotor 200 may be disposed inside the stator 300.

The shaft 100 may be coupled to the rotor 200. When an electromagnetic interaction between the rotor 200 and the stator 300 occurs by supplying a current, the rotor 200 rotates. In addition, the shaft 100 rotates in conjunction with the rotator 200. The shaft 100 is connected to a steering shaft of a vehicle and transmits power to the steering shaft.

The rotor 200 is rotated due to an electrical interaction with the stator 300.

The rotor 200 may include a rotor core and a magnet. The rotor core may be formed to have a form in which a plurality of plates having circular thin steel sheet forms are stacked or to have a single barrel form. A hole to which the shaft 100 is coupled may be formed at a center of the rotor core. A protrusion configured to guide the magnet may protrude from an outer circumferential surface of the rotor core. The magnet may be attached to the outer circumferential surface of the rotor core. A plurality of magnets may be disposed along a circumference of the rotor core at predetermined intervals. The rotor 200 may include a can member which surrounds the magnets to fix the magnets so that the magnets are inhibited from being separated from the rotor core and to inhibit the magnets from being exposed.

A coil may be wound around the stator 300 such that an electrical interaction with the rotor 200 may occur. A specific structure of the stator 300 for winding the coil will be described below. The stator 300 may include a stator core having a plurality of teeth. In the stator core, a yoke portion having a ring shape may be provided, and the teeth may be around which the coil is wound from the yoke portion in a central direction may be provided. The teeth may be provided along an outer circumferential surface of the yoke portion at predetermined intervals. Meanwhile, the stator core may be formed by mutually stacking the plurality of plates having the thin steel sheet forms. In addition, the stator core may be formed by mutually coupling or connecting a plurality of separate cores.

The busbar 400 may be disposed above the stator 300. The busbar 400 may include a terminal inside a mold member having a ring shape.

The wire assembly 500 is connected to the busbar 400 to supply a current thereto.

A sensing magnet 600 is a device coupled to the shaft 100 to operate in conjunction with the rotor 200 so as to detect a position of the rotor 200.

A sensor configured to detect a magnetic force of the sensing magnet 600 may be disposed on a printed circuit board 700. Here, the sensor may be a Hall integrated circuit (IC). The sensor generates a sensing signal by detecting changes of an N pole and an S pole of the sensing magnet 600.

Figure 2:
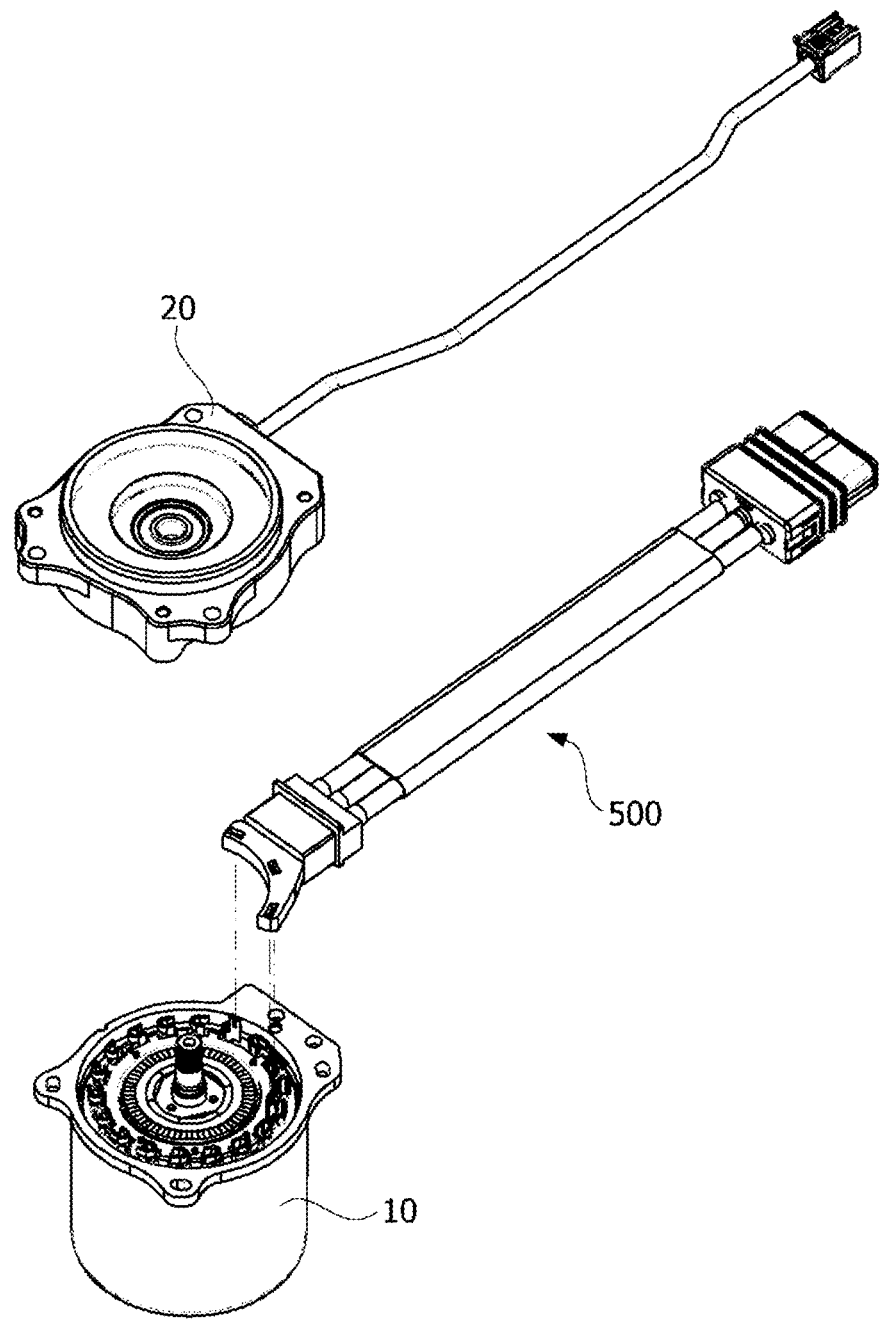
FIG. 2 is a view illustrating a position of a wire assembly.

FIG. 2 is a view illustrating a position of the wire assembly.

Referring to FIG. 2, the wire assembly 500 is seated at an upper side of the housing 10. In addition, the bracket 20 is positioned at an upper side of the wire assembly 500.

Figure 3:
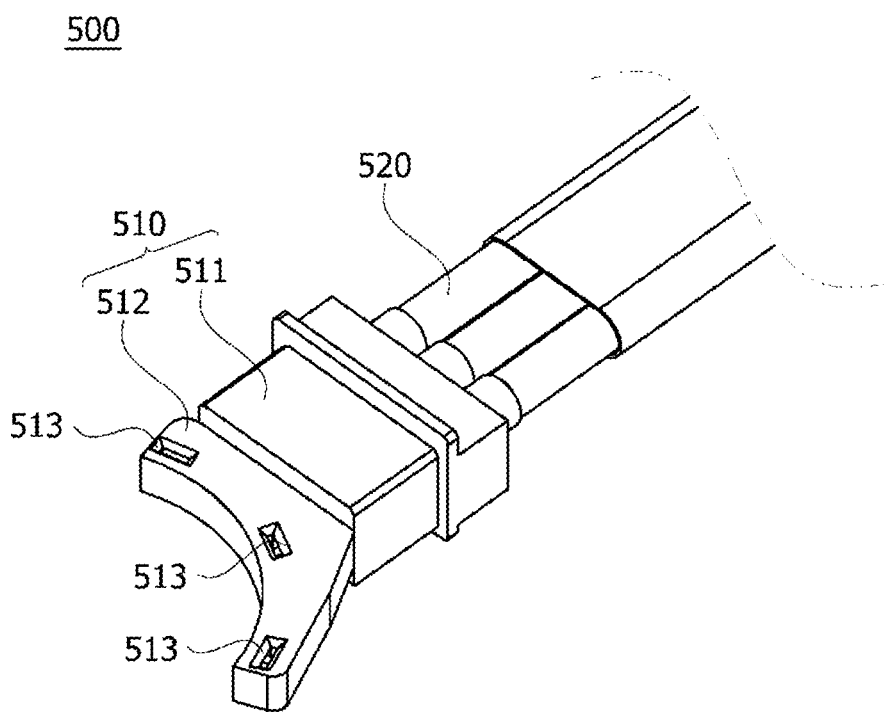
FIG. 3 is a view illustrating the wire assembly illustrated in FIG. 2.

FIG. 3 is a view illustrating the wire assembly illustrated in FIG. 2.

Figure 4:
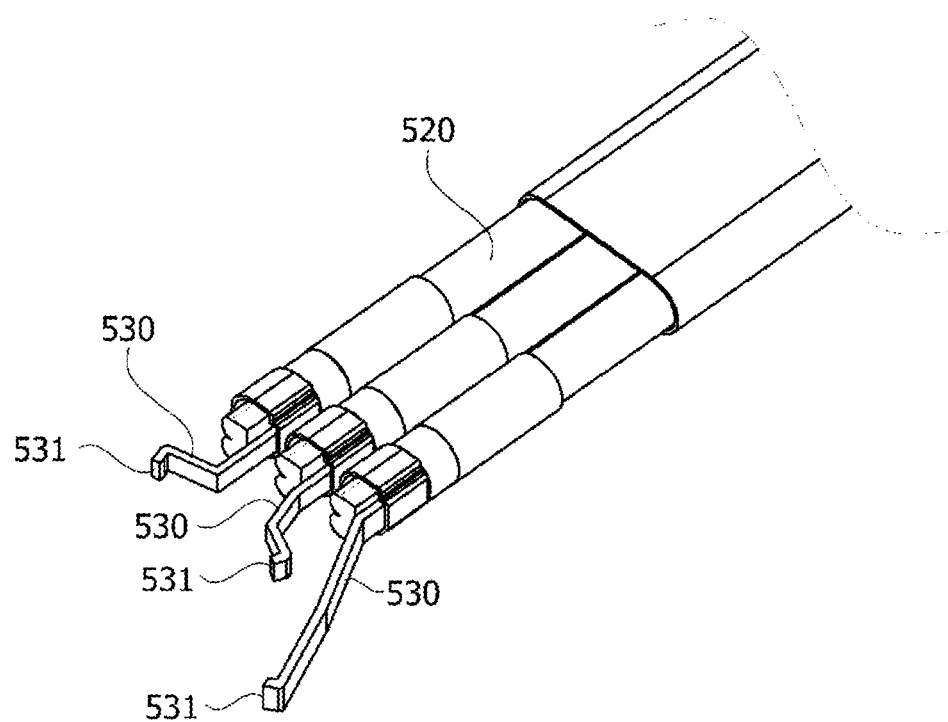
FIG. 4 is a view illustrating cables and first terminals of the wire assembly illustrated in in FIG. 2.

FIG. 4 is a view illustrating cables and first terminals of the wire assembly illustrated in in FIG. 2.

Referring to FIGS. 3 and 4, the wire assembly 500 may include a grommet 510, cables 520, and first terminals 530.

The grommet 510 may include a body 511 and an extension 512. The body 511 and the extension 512 are only functionally distinguished and may be formed of one material so that the body 511 and the extension 512 are connected to each other. The grommet 510 may be formed of an insulating material, and the grommet 510 may be formed of an elastically deformable material.

The body 511 may include parts of the cables 520 and the first terminals 530. The body 511 is a part seated on an upper surface of the housing 10 (see FIG. 2). The extension 512 is disposed to be connected to a front portion of the body 511. The extension 512 surrounds the first terminals 530. Particularly, the extension 512 includes connecting end portions 531 of the first terminals 530. Here, the connecting end portions 531 are end portions of the first terminals 530 and are portions connected to the busbar 400.

Referring to FIG. 4, the connecting end portion 531 of the first terminal 530 may have a shape bent such as a "⌐" shape. Although the connecting end portion 531 should have a shape curved in a "U" shape for a fusing process, in the case of the motor according to the embodiment, since the fusing process is eliminated, the shape of the connecting end portion 531 may be simplified into the "⌐" shape. A cross-sectional shape of the connecting end portion 531 of the first terminal 530 may be a rectangular shape. The connecting end portions 531, which have the rectangular cross sections, of the first terminals 530 may be easily inserted into second terminals 410 (see FIG. 7).

The number of the first terminals 530 may be three. Three first terminals 530 are connected to three cables 520. In addition, three first terminals 530 are coupled to the second terminals 410 (see FIG. 7) having a U-phase, a V-phase, and a W-phase.

The extension 512 of the grommet 510 may include insert holes 513. The insert holes 513 are disposed to pass through from a lower surface of the grommet 510 to an upper surface thereof. In addition, positions of the insert holes 513 correspond to positions of the connecting end portions 531 of the first terminals 530. Accordingly, the connecting end portions 531 of the first terminals 530 are positioned in the insert holes 513. In addition, the connecting end portions 531 of the first terminals 530 are exposed to the outside through the insert holes 513. The connecting end portions 531 may be positioned at centers of the insert holes 513. The second terminals 410 (see FIG. 7) of the busbar 400 are inserted into the insert holes 513.

Figure 5:
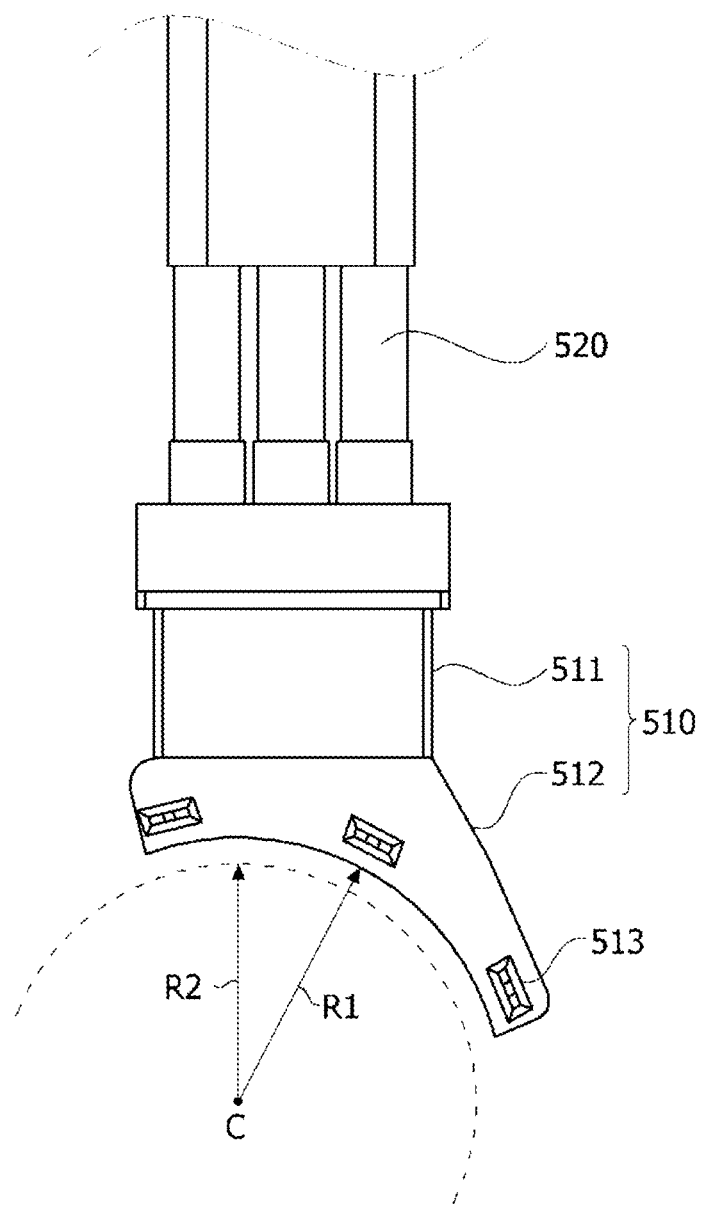
FIG. 5 is a view illustrating the form of an extension of a grommet.

FIG. 5 is a view illustrating the form of the extension of the grommet.

Referring to FIG. 5, a shape of the extension 512 of the grommet 510 corresponds to positions of the first terminals 530. The extension 512 may be implemented in various forms to surround all the first terminals 530. A front surface of the extension 512 may be a curved surface. Here, based on a rotation center C of the motor, a radius R1 of a curvature of the front surface of the extension 512 should be at least greater than an outer diameter R2 of the sensing magnet 600 (see FIG. 1). This is because the sensing magnet 600 (see FIG. 1) is disposed inside the extension 512.

Figure 6:
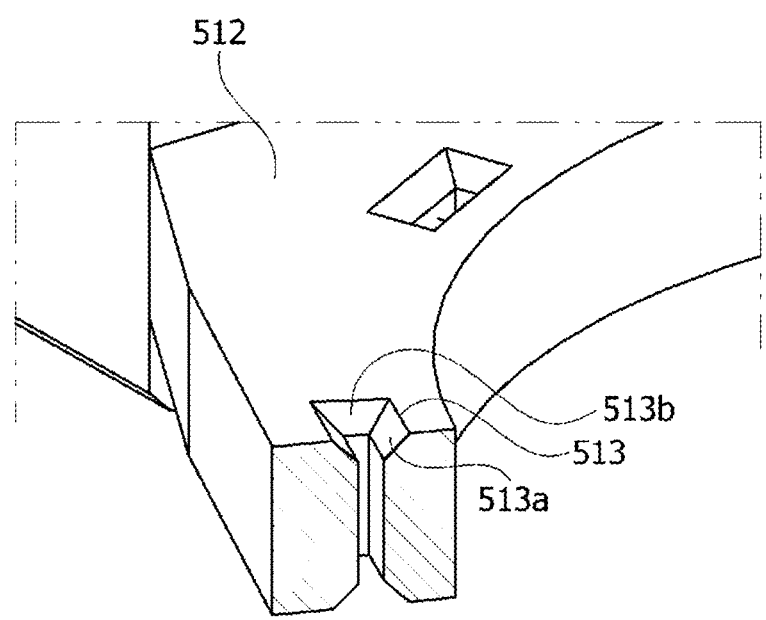
FIG. 6 is a view illustrating a cross section of the extension for illustrating the insert hole.

FIG. 6 is a view illustrating a cross section of the extension for illustrating the insert hole.

Referring to FIG. 6, an inlet of the insert hole 513 may have an expanded form. That is, sidewalls 513a and 513b continuing from the upper surface or lower surface of the extension 512 to the insert hole 513 may have inclined forms. The sidewalls 513a and 513b assist the second terminal 410 (see FIG. 7) of the busbar 400 to be easily inserted into the insert hole 513 and guide the second terminal 410 (see FIG. 7).

Figure 7:
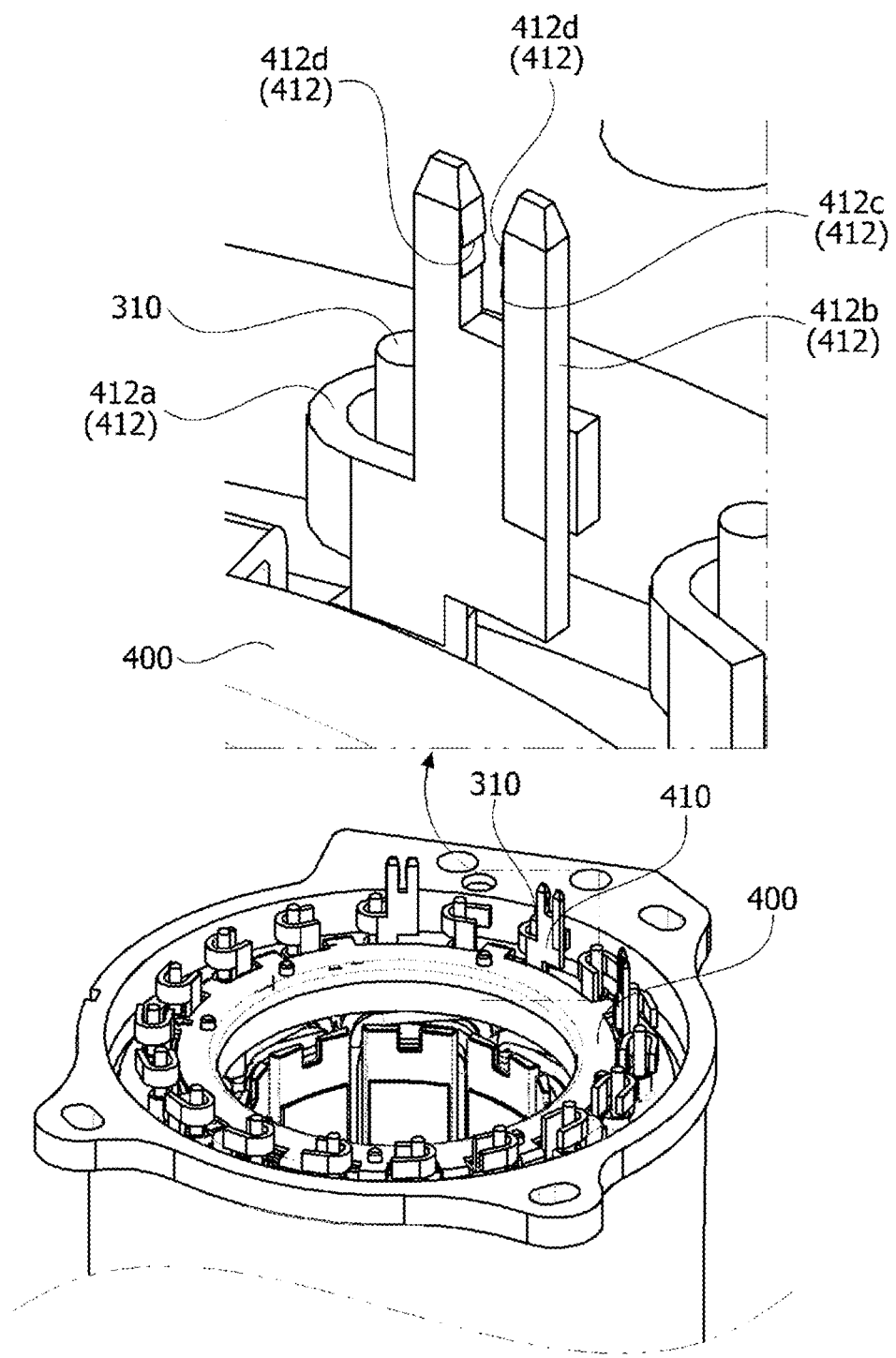
FIG. 7 is a view illustrating a busbar.

FIG. 7 is a view illustrating the busbar.

Figure 8:
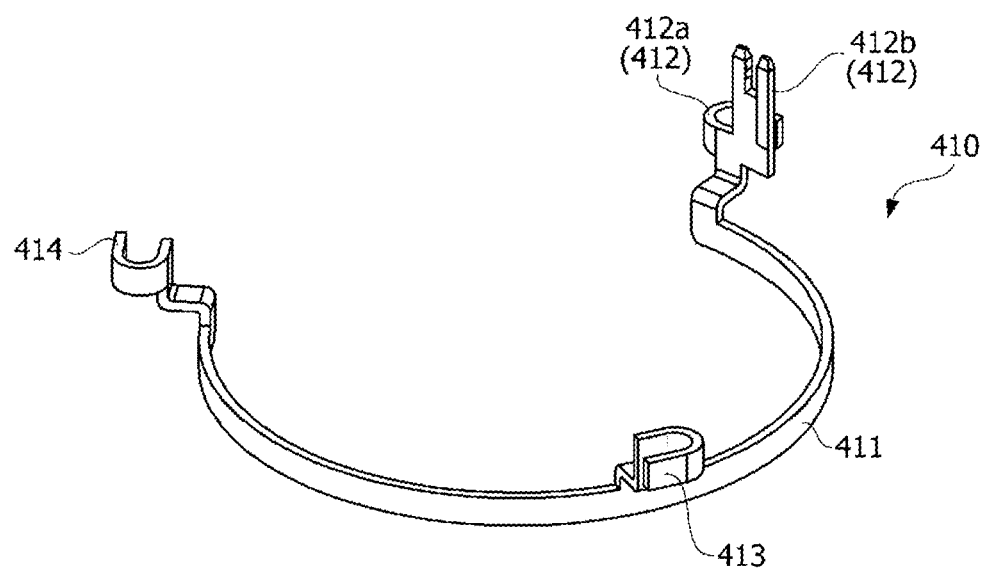
FIG. 8 is a view illustrating a second terminal of the busbar.

FIG. 8 is a view illustrating the second terminal of the busbar.

Referring to FIGS. 7 and 8, the busbar 400 may include the second terminals 410. The second terminals 410 are insertion-coupled to the first terminals 530 of the wire assembly 500 (see FIG. 4). The second terminal 410 may include a base 411 having a ring shape and three terminals 412, 413, and 414 connected to the base 411. The base 411 may be mounted on a mold member of the busbar 400. Any one terminal 412 of three terminals 412, 413, and 414 may be insertion-coupled to the first terminal 530.

The terminal 412 may include a connector 412a and a clip 412b.

The connector 412a is connected to a coil 310 wound around the stator 300. The connector 412a may have a curved shape such as a "u" shape. The clip 412b is connected to the connector 412a. In addition, the clip 412b is disposed to stand up vertically. In addition, the clip 412b may include a slot 412c. The slot 412c may have a concave form formed from an upper end of the clip 412b toward a lower side thereof. The first terminal 530 of the wire assembly 500 (see FIG. 4) is inserted into the slot 412c. A hooking step 412d is disposed on an inner sidewall of the slot 412c. The hooking step 412d has a latch form, and when the first terminal 530 is inserted into the slot 412c once, the first terminal 530 is fixed so as to not be pulled out of the slot 412c. A width of the slot 412c is suitably determined by considering a width of the connecting end portion 531 of the first terminal 530 so as to facilitate insertion-coupling.

Figure 9:
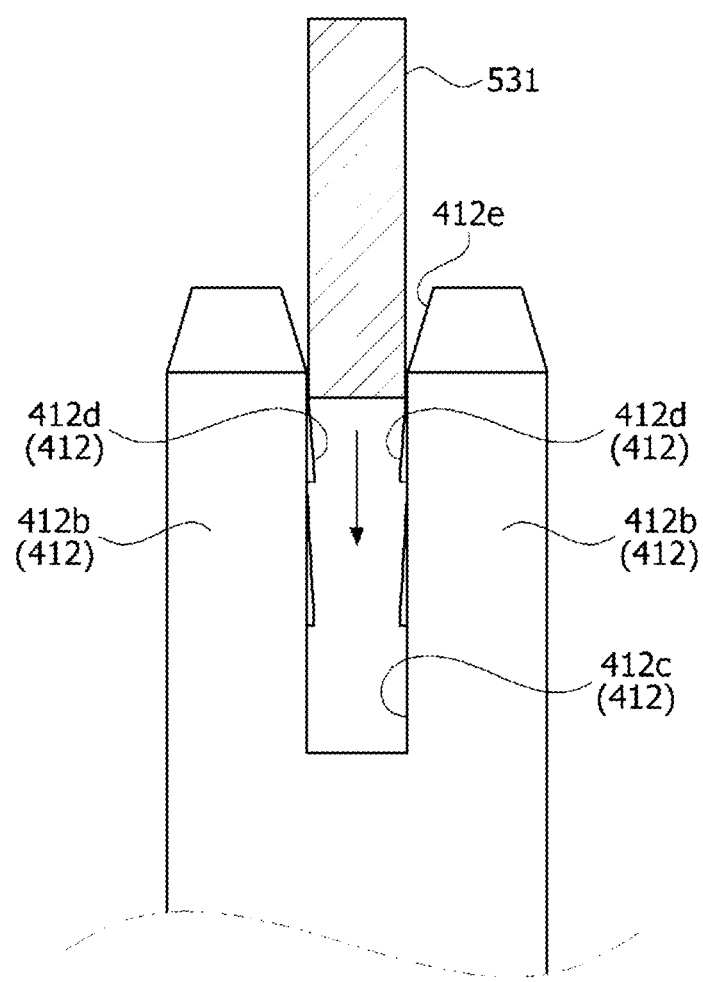
FIG. 9 is a view illustrating the first terminal and the second terminal which are insertion-coupled.

FIG. 9 is a view illustrating the first terminal and the second terminal which are insertion-coupled.

Referring to FIGS. 3 and 9, when the clip 412b of the second terminal 410 is inserted into the insert hole 513 of the grommet 510, a lower end of the connecting end portion 531 is inserted into the slot 412c first. In this case, the insert hole 513 guides the clip 412b. When the connecting end portion 531 is completely inserted into the slot 412c, the clip 412b is fixed so as to not be pulled out of the insert hole 513 by the hooking step 412d having the latch form. Here, since the clip 412b of each of the second terminals 410 having the U-phase, the V-phase, and the W-phase is inserted into the insert hole 513 through one coupling process, the number of manufacturing processes can be significantly reduced.

Meanwhile, an inlet 412e of the slot 412c may have an inclined form so as to easily insert the connecting end portion 531 thereinto. That is, a width of the inlet of the slot 412c may decrease toward a lower side thereof. A size of the insert hole 513 may correspond to a width of the clip 412b. In addition, a shape of the insert hole 513 may correspond to a shape of the clip 412b.

As described above, a motor according to one exemplary embodiment of the present invention has been specifically described with respect to the accompanying drawings.

The above-described embodiments should be considered in a descriptive sense only and not for purposes of limitation. The scope of the present invention is defined not by the detailed description but by the appended claims and encompasses all modifications and alterations derived from meanings and the scope and equivalents of the appended claims.

The invention claimed is:

1. A motor comprising:
a stator;
a rotor disposed inside the stator;
a shaft coupled to the rotor;
a busbar disposed above the stator; and
a wire assembly connected to the busbar,
wherein the wire assembly includes a grommet, a cable of which a part is disposed inside the grommet, and a first terminal connected to the cable,
wherein the first terminal includes a connecting end portion,
wherein the grommet includes a body having the cable therein and an extension extending from the body and having the first terminal therein,
wherein the extension includes an insert hole formed to pass through from a lower surface of the extension to an upper surface of the extension,
wherein the connecting end portion is disposed inside the insert hole,
wherein the busbar comprises a second terminal coupled to the first terminal, and
wherein the second terminal comprises a connector having a curved shape and a clip protruding from the connector, the clip being coupled to the connecting end portion of the first terminal.

2. The motor of claim 1, wherein:
the first terminal and the second terminal are insertion-coupled.

3. The motor of claim 1, comprising a sensing magnet coupled to the shaft,
wherein a front surface of the extension is a curved surface, and a radius of a curvature of the front surface of the extension is greater than an outer diameter of the sensing magnet.

4. The motor of claim 1, wherein an upper surface or a lower surface of the insert hole includes a sidewall having an inclined shape.

5. The motor of claim 1, wherein the clip includes a slot that is concavely formed from an upper end of the clip toward a lower side thereof and to which the connecting end portion of the first terminal is insertion-coupled.

6. The motor of claim 5, wherein the slot includes a hooking step protruding from a sidewall of the slot and configured to restrict movement of the connecting end portion of the first terminal.

7. The motor of claim 5, wherein a width of an inlet of the slot decreases toward a lower side thereof.

8. The motor of claim 1, wherein the second terminal includes a base having a ring shape and a plurality of terminals connected to the base, and wherein any one of the plurality of terminals includes the clip.

9. The motor of claim 1, wherein the clip is disposed inside the insert hole.

10. A motor comprising:

a stator;

a rotor disposed inside the stator;

a shaft coupled to the rotor;

a busbar disposed above the stator; and a wire assembly connected to the busbar, wherein the wire assembly includes a grommet, a cable of which a part is disposed inside the grommet, and a first terminal connected to the cable, wherein the first terminal includes a connecting end portion, wherein the grommet includes a body having the cable therein and an extension extending from the body and having the first terminal therein, wherein the extension includes an insert hole formed to pass through from a lower surface of the extension to an upper surface of the extension, wherein the connecting end portion is disposed inside the insert hole, wherein the busbar includes a second terminal, wherein the first terminal and the second terminal are insertion-coupled, and wherein the second terminal includes a connector connected to a coil wound around the stator and a clip protruding upward from one side of the connector and coupled to the connecting end portion of the first terminal.

11. The motor of claim 10, wherein the clip includes a slot which is concavely formed from an upper end of the clip toward a lower side thereof and to which the connecting end portion of the first terminal is insertion-coupled.

12. The motor of claim 11, wherein the slot includes a hooking step protruding from a sidewall of the slot and configured to restrict movement of the connecting end portion of the first terminal.

13. The motor of claim 10, wherein the second terminal includes a base having a ring shape and a plurality of terminals connected to the base, and wherein any one of the plurality of terminals includes the clip.

14. The motor of claim 10, wherein the clip is disposed inside the insert hole.

15. The motor of claim 11, wherein a width of an inlet of the slot decreases toward a lower side thereof.

16. The motor of claim 10, comprising a sensing magnet coupled to the shaft, wherein a front surface of the extension is a curved surface, and a radius of a curvature of the front surface of the extension is greater than an outer diameter of the sensing magnet.

17. The motor of claim 10, wherein an upper surface or a lower surface of the insert hole includes a sidewall having an inclined shape.

* * * * *